United States Patent

[11] 3,618,621

| [72] | Inventor | Sven-Ake Nordegren<br>Sodertalje, Sweden |
|---|---|---|
| [21] | Appl. No. | 27,031 |
| [22] | Filed | Apr. 9, 1970 |
| [45] | Patented | Nov. 9, 1971 |
| [73] | Assignee | Alfa-Laval AB<br>Tumba, Sweden |

[54] WASHING ARRANGEMENT FOR PIPELINE MILKING SYSTEM
7 Claims, 1 Drawing Fig.

[52] U.S. Cl. .................................................. 134/57 R,
134/93, 134/101, 134/102, 134/107, 134/169 C,
134/171
[51] Int. Cl. .................................................. B08b 3/10,
B08b 9/06
[50] Field of Search .................................................. 134/56 R,
57 R, 57 D, 93, 101, 107, 166 C, 169 C

[56] References Cited
UNITED STATES PATENTS
2,859,760 11/1958 Borell .......................... 134/57 D X
2,915,072 12/1959 Merritt ......................... 134/57 R
3,119,400 1/1964 Bihler ........................... 134/93 X FOREIGN PATENTS
1,296,837 5/1962 France ......................... 134/57 R
1,210,150 2/1966 Germany ...................... 134/57 D

*Primary Examiner*—Daniel Blum
*Attorney*—Davis, Hoxie, Faithfull & Hapgood

ABSTRACT: Means are provided for inducing flow of water from a hot water source through a pipeline milking system; and a reversing valve has a first position wherein water which has passed through the system is discharged therefrom, the valve having a second position wherein water which has passed through the system is returned thereto for repeated flow through the system. By temperature-sensing means operatively connected to this valve, it is actuated from said first to said second position in response to heating of the system to a predetermined temperature by hot water flowing through it; and means responsive to this actuation of the valve are provided for adding detergent to the water flowing through the system.

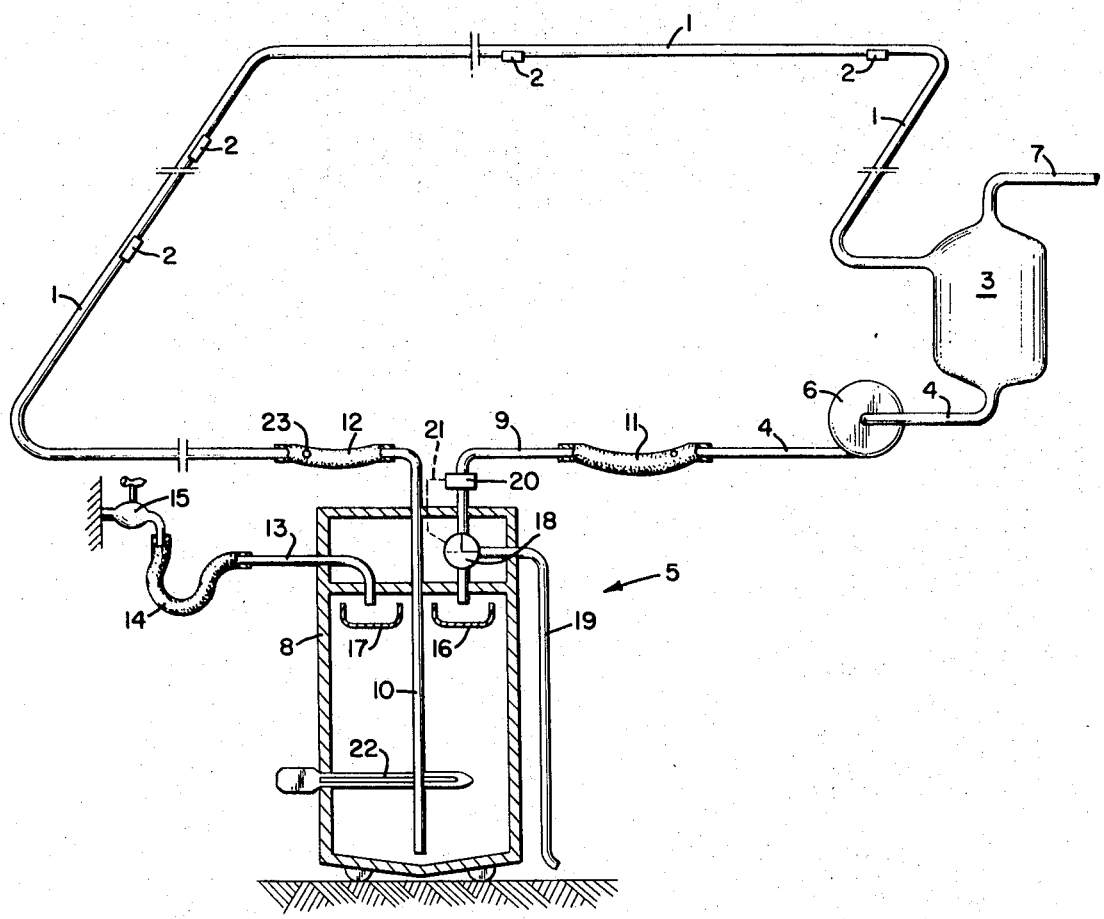
INVENTOR.
SVEN-AKE NORDEGREN

WASHING ARRANGEMENT FOR PIPELINE MILKING SYSTEM

The present invention relates to an arrangement for washing pipeline milking systems, which has considerably advantages over previously known washing arrangements.

Different kinds of washing apparatus are presently available for milking systems. They can be connected to pipeline milking systems for automatically performing washing operations according to programs made up in advance. It is common to most of these programs that during a stage of the washing operation, a hot detergent solution is circulated a number of times through the pipeline milking system. Such a circulation of a hot detergent solution has been found to be necessary in order to achieve a satisfactory cleaning of the pipeline milking system, and is consequently also included in the washing system according to the present invention.

According to previously known washing systems, this circulation of hot detergent solution normally is preceded by a prerinsing of the pipeline milking system with cold water. In order to maintain a sufficiently high temperature of the detergent solution thereafter circulated through the system, for the achievement of a satisfactory cleaning of the system during the whole time of circulation, a thermostat-controlled heating unit is arranged in a vessel through which the detergent solution passes, which vessel is connected to both ends of the pipeline milking system. The circulation of the detergent solution through the pipeline milking system and the vessel is carried out by means of the same devices as used for the milking operation.

The washing operation is usually terminated by circulating a special disinfection liquid through the pipeline milking system. (In certain cases the detergent solution is mixed with a disinfectant.)

According to the invention, a new arrangement is proposed for washing a pipeline milking system. This arrangement, requiring that the pipeline milking system be connectable to a source of hot water in order to be passed through by such water, is characterized by a reversing valve arranged to direct hot water having passed through the pipeline milking system, either away from the system or back to it for a repeated through flow, a temperature-sensing means which is arranged to indicate when the pipeline milking system is heated to a predetermined temperature by the hot water flowing through it, and then to actuate the reversing valve to reverse from a position in which it directs water away from the pipeline milking system, into a position in which it directs water back to the system for repeated through flow, and means actuatable in connection with said reversing operation to add detergent to the water then flowing in the closed circuit. The temperature-sensing means preferably is arranged to sense the temperature of liquid having passed through the pipeline milking system.

Preferably a vessel is included in the arrangement according to the invention, which vessel has an inlet and an outlet by means of which it is connectable to the pipeline milking system so that liquid may be circulated through the pipeline milking system and the vessel. This vessel may comprise said source of hot water and may contain the means for adding detergent to the hot water.

According to a preferred embodiment of the invention, the outlet of the vessel is located near its bottom and a thermostat-controlled heating unit is located within the vessel at a level such that water situated above the heating unit in the vessel is heated to a predetermined high temperature, and that lukewarm water is obtained below the heating unit for an introductory rinsing of the pipeline milking system.

By the arrangement according to the invention, a number of advantages are achieved which are not achieved by any prior arrangement for washing pipeline milking systems Among other things, the following is achieved:
a. energy for heating is saved,
b. milk left in the pipeline milking system does not coagulate and stick to the pipe walls, thereafter being very difficult to remove,
c. the total washing time may be shortened,
d. the most efficient prerinsing of the system is achieved, whereby the subsequent circulation of the detergent solution may be carried out with a minimum of detergent,
e. a unit for keeping the detergent solution hot is not necessary, as the system is preheated to the temperature desired for the washing operation,
f. if a heating unit is needed in the vessel for heating water to be mixed with detergent for the forming of a detergent solution, this unit may be disconnected during the circulation of the detergent solution through the system, so as to prevent detergent from burning onto and attacking the heating unit,
g. a possible heating unit in the vessel may have a very small capacity, as the heating of the water for the detergent solution can be extended over quite a long time, i.e., the time period between two washing operations. Thus, the whole washing apparatus will be cheaper, and it may be plugged into already available electrical sockets on the premises. If larger heating units are used, arrangements will be needed which increase the cost of their connection to the electric mains.

A preferred embodiment of a washing arrangement according to the invention is further described in the following with reference to the attached drawing, in which the single illustration shows the arrangement schematically, in section, connected to a pipeline milking system also shown schematically.

The pipeline milking system as illustrated comprises a pipeline 1 with means 2 for connection of a number of milking units, an air separator 3 and a pipe 4 leading from the lower part of the separator, the system being connected to a washing apparatus 5. In the pipe 4 is a centrifugal pump 6 for pumping liquid from the air separator 3, which is connected through conduit 7 to a vacuum pump (not shown).

The washing apparatus 5 consists of a vessel 8 having an inlet conduit 9 and an outlet conduit 10, which are arranged to be connected by tubes 11 and 12 to the pipe 4 and to the end of the pipeline 1 remote from the air separator 3. The vessel 8 has a second inlet conduit 13 which, by means of a tube 14, is connected to a tap 15.

The inlet conduits 9 and 13 both lead to small open troughs 16 and 17, respectively, located inside the vessel 8. In the inlet conduit 9 is a three-way valve 18 to which is connected an outlet conduit 19, The three-way valve 18, which is arranged to connect the inlet conduit 9 either to the vessel 8 or the outlet conduit 19, is influenced for its adjustment by a temperature-sensing means 20 located so that it may sense the temperature of liquid having passed through the pipeline milking system and arriving at the inlet conduit 9. A dotted line 21 indicates the connection between the temperature-sensing means 20 and the three-way valve 18. Within the vessel 8 is a heating unit 22 located at a level spaced from the bottom of the vessel about a quarter of the height of the latter.

From the tap 15, the vessel 8 is filled with cool water, after which the trough 17 is charged with disinfectant and the trough 16 with detergent. The water in the vessel 8 is heated automatically by the unit 22 to the desired temperature, There is a thermostat (not shown) in the unit, which is arranged to disconnect the unit when the desired temperature of the water is achieved. Thus, all the water situated above the unit 22 in vessel 8 has substantially the same temperature, while the water situated under the unit has a lower temperature. The prevailing temperature gradually decreases downward in the vessel from the unit 22.

The vacuum pump connected to the air separator 3 is then started and the lukewarm water in the lower part of the vessel 8 is sucked upward through the outlet conduit 10 and further through the pipeline 1. In the tube 12 there is a little hole 23, through which air is admitted to the pipeline 1, so that the liquid flowing through it will form plugs which move forward in the pipeline and efficiently clean the same throughout its periphery. In the air separator 3 this air is separated from the water, and the latter together with milk residuals accompanying it is pumped from the air separator through the pipe 4 to the inlet conduit 9 of the vessel 8. In the inlet conduit 9, the three-way valve 18 is in a position such that water is led away through the outlet conduit 19.

When the lukewarm water in the vessel 8 is exhausted, hot water will flow through the pipeline 1. The latter cools this water, but after a while the pipeline itself is heated so that the hot water is not cooled very much on its way through the same. Thus, hot water will eventually pass the temperature-sensing means 20 and influence the three-way valve 18, so that the latter is adjusted to a position in which water arriving at the same is led into the vessel 8.

On its way to the vessel 8, the hot water passes through the trough 16 and carries with it the detergent situated therein. The detergent is mixed with the rest of the hot water in vessel 8, so that a hot detergent solution is formed, which is circulated a number of times through the pipeline milking system and the vessel 8.

After a while, the whole pipeline milking system is satisfactorily cleaned, and the valve 18 is reversed so that the detergent solution is led away through the outlet conduit 19. This reversal of the valve may be performed automatically by the temperature-sensing means 20 in the inlet conduit 9, when the temperature of the detergent solution has dropped to a predetermined temperature. Normally, this will take an unnecessarily long time, however, and therefore a timing device (not shown) will do the reversal of the valve 18 after a predetermined period of time.

When the vessel 8 and the pipeline milking system have been emptied of all detergent solution, new water is filled into the vessel from the tap 15, whereby the disinfectant in the trough 17 is brought down into the vessel 8 and is mixed with the new water. The resulting disinfecting solution is then circulated in the same way as the detergent solution, a number of times through the pipeline milking system and the vessel 8, after which it is led away through the outlet conduit 19.

After the circulation of detergent solution as well as the circulation of disinfectant solution, the pipeline milking system is dried by sucking air through it.

With the exception of the change between prerinsing with hot water and circulation of detergent solution, the changes between the different stages of the washing operation are performed by the previously mentioned timing device (not shown). The advantage of the thermostatically controlled change between the prerinsing and the circulation of detergent solution is that the latter step is not started until the proper temperature of the pipeline milking system is achieved. This time varies from one pipeline milking system to another, due to different circumstances.

In order to make certain that a washing operation will take place even if there should be something wrong with the heating unit 22, so that a sufficiently high temperature of the water in the vessel 18 is not achieved, (means (not shown) influenced by the liquid level in the vessel are arranged to reverse the three-way valve 18 so that the circulation will start before the vessel 8 is empty of water.

The temperature-sensing means 20 may be of any conventional form having the usual thermostat operable through an electrical or mechanical connection to actuate a valve from a first to a second position when the temperature rises to a certain value and from the second to the first position when the temperature returns to a certain lower value.

I claim:

1. In combination with a pipeline milking system, a source of hot water, means for inducing flow of water from said source through the milking system, a reversing valve connected into said system and having a first position wherein water which has passed through the system is discharged therefrom, the valve having a second position wherein water which has passed through the system is returned thereto for repeated flow through the system, temperature-sensing means arranged to sense heating of said system to a predetermined temperature by hot water flowing through the system, said sensing means being operatively connected to the valve and being operable in response to said heating to actuate the valve from said first position to said second position, and means operable in response to said actuation of the valve for adding detergent to the water flowing through the system.

2. The combination according to claim 1, in which said source includes a vessel having an inlet and an outlet for passage of liquid circulating through said system.

3. The combination according to claim 2, in which said outlet is located at the lower part of the vessel, said source including also a thermostatically controlled heating unit located in the vessel at a level intermediate said inlet and outlet, whereby water situated above the heating unit in the vessel is heated to a predetermined high temperature and lukewarm water is obtained below the heating unit for introductory rinsing of said system.

4. The combination according to claim 1, in which said temperature-sensing means is positioned to sense the temperature of liquid which has passed through said system.

5. The combination according to claim 2, in which said temperature-sensing means is positioned near said inlet of the vessel.

6. The combination according to claim 1, in which said means for adding detergent includes a trough for containing the detergent and located in the path of water which has passed through said system and is being returned thereto.

7. The combination according to claim 6, in which said trough is located within said source of hot water.

* * * * *